United States Patent
Xu et al.

(10) Patent No.: US 8,117,137 B2
(45) Date of Patent: Feb. 14, 2012

(54) FIELD-PROGRAMMABLE GATE ARRAY BASED ACCELERATOR SYSTEM

(75) Inventors: Ning-yi Xu, Beijing (CN); Feng-Hsiung Hsu, Cupertino, CA (US); Xiong-Fei Cai, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1083 days.

(21) Appl. No.: 11/737,605

(22) Filed: Apr. 19, 2007

(65) Prior Publication Data

US 2008/0262984 A1   Oct. 23, 2008

(51) Int. Cl.
    G06F 15/18   (2006.01)
(52) U.S. Cl. .......................................... 706/12
(58) Field of Classification Search ................ 706/12; 716/16
    See application file for complete search history.

(56) References Cited

U.S. PATENT DOCUMENTS

| | | |
|---|---|---|
| 5,320,538 A | 6/1994 | Baum |
| 5,423,554 A | 6/1995 | Davis |
| 5,432,895 A | 7/1995 | Myers |
| 5,490,784 A | 2/1996 | Carmein |
| 5,577,981 A | 11/1996 | Jarvik |
| 5,712,922 A | 1/1998 | Loewenthal et al. |
| 5,883,628 A | 3/1999 | Mullaly et al. |
| 5,892,961 A | 4/1999 | Trimberger |
| 5,892,962 A | 4/1999 | Cloutier |
| 5,913,727 A | 6/1999 | Ahdoot |
| 6,011,407 A | 1/2000 | New |
| 6,037,914 A | 3/2000 | Robinson |
| 6,064,749 A | 5/2000 | Hirota et al. |
| 6,084,979 A | 7/2000 | Kanade et al. |
| 6,102,832 A | 8/2000 | Tani |
| 6,122,627 A | 9/2000 | Carey et al. |
| 6,134,540 A | 10/2000 | Carey et al. |
| 6,141,034 A | 10/2000 | McCutchen |
| 6,199,008 B1 | 3/2001 | Aratow et al. |
| 6,222,757 B1 | 4/2001 | Rau et al. |
| 6,226,237 B1 | 5/2001 | Chan et al. |
| 6,356,637 B1 | 3/2002 | Garnett |

(Continued)

FOREIGN PATENT DOCUMENTS

EP   1170868 A1   1/2002

OTHER PUBLICATIONS

Dillinger,P. et al. "FPGA based Real-Time Image Segmentation for Medical Systems and Data Processing", IEEE. 2005.*

(Continued)

*Primary Examiner* — Jeffrey A Gaffin
*Assistant Examiner* — Benjamin Buss
(74) *Attorney, Agent, or Firm* — Lee & Hayes, PLLC

(57) ABSTRACT

Accelerator systems and methods are disclosed that utilize FPGA technology to achieve better parallelism and flexibility. The accelerator system may be used to implement a relevance-ranking algorithm, such as RankBoost, for a training process. The algorithm and related data structures may be organized to enable streaming data access and, thus, increase the training speed. The data may be compressed to enable the system and method to be operable with larger data sets. At least a portion of the approximated RankBoost algorithm may be implemented as a single instruction multiple data streams (SIMD) architecture with multiple processing engines (PEs) in the FPGA. Thus, large data sets can be loaded on memories associated with an FPGA to increase the speed of the relevance ranking algorithm.

22 Claims, 7 Drawing Sheets

U.S. PATENT DOCUMENTS

| | | | |
|---|---|---|---|
| 6,408,257 | B1 | 6/2002 | Harrington et al. |
| 6,477,527 | B2 | 11/2002 | Carey et al. |
| 6,567,834 | B1 | 5/2003 | Marshall et al. |
| 6,601,049 | B1 | 7/2003 | Cooper |
| 6,611,823 | B1 | 8/2003 | Selmic et al. |
| 6,662,470 | B2 | 12/2003 | Ellis, III |
| 6,751,600 | B1 | 6/2004 | Wolin |
| 6,945,869 | B2 | 9/2005 | Kim et al. |
| 6,951,515 | B2 | 10/2005 | Ohshima et al. |
| 6,999,083 | B2 | 2/2006 | Wong et al. |
| 7,001,272 | B2 | 2/2006 | Yamashita et al. |
| 7,024,033 | B2 | 4/2006 | Li et al. |
| 7,050,078 | B2 | 5/2006 | Dempski |
| 7,099,745 | B2 | 8/2006 | Ebert |
| 7,138,963 | B2 | 11/2006 | Hobgood et al. |
| 7,162,054 | B2 | 1/2007 | Meisner et al. |
| 7,197,497 | B2 | 3/2007 | Cossock |
| 7,318,051 | B2 | 1/2008 | Weston et al. |
| 7,369,869 | B2 | 5/2008 | Wiatrowski et al. |
| 7,398,093 | B2 | 7/2008 | Hull et al. |
| 7,446,772 | B2 | 11/2008 | Wong et al. |
| 7,526,101 | B2 | 4/2009 | Avidan |
| 7,660,793 | B2 | 2/2010 | Indeck et al. |
| 7,707,163 | B2 | 4/2010 | Anzalone et al. |
| 7,805,438 | B2 | 9/2010 | Liu et al. |
| 7,840,482 | B2 | 11/2010 | Singla et al. |
| 7,844,085 | B2 | 11/2010 | Lu et al. |
| 2002/0010734 | A1 | 1/2002 | Ebersole et al. |
| 2002/0123977 | A1 | 9/2002 | Raz |
| 2002/0167536 | A1 | 11/2002 | Valdes et al. |
| 2003/0002731 | A1 | 1/2003 | Wersing et al. |
| 2004/0111388 | A1 | 6/2004 | Boiscuvier et al. |
| 2004/0136471 | A1 | 7/2004 | Pao et al. |
| 2004/0193441 | A1 | 9/2004 | Altieri |
| 2004/0225483 | A1 | 11/2004 | Okoniewski et al. |
| 2005/0049913 | A1 | 3/2005 | Huddleston et al. |
| 2005/0144149 | A1 | 6/2005 | Li et al. |
| 2005/0234953 | A1 | 10/2005 | Zhang et al. |
| 2005/0246328 | A1 | 11/2005 | Zhang et al. |
| 2005/0280661 | A1 | 12/2005 | Kobayashi et al. |
| 2006/0013473 | A1 | 1/2006 | Woodfill et al. |
| 2006/0038833 | A1 | 2/2006 | Mallinson et al. |
| 2006/0047704 | A1 | 3/2006 | Gopalakrishnan |
| 2006/0105838 | A1 | 5/2006 | Mullen |
| 2006/0110028 | A1 | 5/2006 | Liu et al. |
| 2006/0126740 | A1 | 6/2006 | Lin et al. |
| 2006/0136411 | A1 | 6/2006 | Meyerzon et al. |
| 2006/0149883 | A1 | 7/2006 | Benbow et al. |
| 2006/0224532 | A1 | 10/2006 | Duan et al. |
| 2006/0262140 | A1 | 11/2006 | Kujawa et al. |
| 2006/0294059 | A1 | 12/2006 | Chamberlain et al. |
| 2007/0022063 | A1 | 1/2007 | Lightowler |
| 2007/0035562 | A1 | 2/2007 | Azuma et al. |
| 2007/0038944 | A1 | 2/2007 | Carignano et al. |
| 2007/0073749 | A1 | 3/2007 | Fan |
| 2007/0110298 | A1 | 5/2007 | Graepel et al. |
| 2007/0132785 | A1 | 6/2007 | Ebersole et al. |
| 2007/0162448 | A1 | 7/2007 | Jain et al. |
| 2007/0233679 | A1 | 10/2007 | Liu et al. |
| 2007/0244884 | A1* | 10/2007 | Yang .............................. 703/14 |
| 2008/0004865 | A1 | 1/2008 | Weng et al. |
| 2008/0018668 | A1 | 1/2008 | Yamauchi |
| 2008/0027912 | A1 | 1/2008 | Liu et al. |
| 2008/0027925 | A1 | 1/2008 | Li et al. |
| 2008/0033939 | A1 | 2/2008 | Khandelwal |
| 2008/0060034 | A1 | 3/2008 | Egnal et al. |
| 2008/0097938 | A1 | 4/2008 | Guyon et al. |
| 2008/0114724 | A1 | 5/2008 | Indeck et al. |
| 2008/0126275 | A1 | 5/2008 | Crnojevic et al. |
| 2008/0140589 | A1 | 6/2008 | Basu et al. |
| 2008/0150963 | A1 | 6/2008 | Stambaugh |
| 2009/0031104 | A1 | 1/2009 | Vorbach et al. |
| 2009/0157571 | A1 | 6/2009 | Smith et al. |
| 2009/0240680 | A1 | 9/2009 | Tankovich et al. |
| 2009/0265290 | A1 | 10/2009 | Ciaramita et al. |
| 2009/0287620 | A1 | 11/2009 | Xu |
| 2009/0287621 | A1 | 11/2009 | Krupka et al. |

OTHER PUBLICATIONS

Xilinx "Virtex-II Pro FPGAs: The Highest System Performance; The Lowest System Cost" (Product Brochure). 2004.*

Eick,S.G. et al. "Hardware Accelerated Algorithms for Semantic Processing of Document Streams", IEEE Aerospace Conference, Big Sky, MT, Mar. 4-11, 2006.*

De Fuentes,M.A.S. "A Parallel Programming Model for a Multi-FPGA Multiprocessor Machine", Thesis, University of Toronto. 2006.*

McGettrick,S. et al. "Searching the Web with an FPGA Based Search Engine". ARC 2007, LNCS 4419, pp. 350-357, 2007.*

Nair,V. et al. "An FPGA-Based People Detection System". EURASIP Journal on Applied Signal Processing 2005:7, pp. 1047-1061.*

Vu,H-T. et al. "Using RankBoost to Compare Retrieval Systems". CIKM'05, Proc. 14th ACM Int'l Conference in Information and Knowledge Managemetn. 2005.. pp. 309-310.*

Cuenca,S.A. et al. "Reconfigurable Frame-Grabber for Real-Time Automated Visual Inspection (RT-AVI) Systems". FPL2001, LNCS 2147, pp. 223-231, 2001.*

Mutlu O. et al. "Address-Value Delta (AVD) Prediction: A Hardware Technique for Efficiently Parallelizing Dependent Cache Misses". IEEE Transactions on Computers, vol. 55, No. 12, Document 2006.*

Ghoting,A. et al. "A Characterization of Data Mining Algorithms on a Modern Processor". Proc. of the First Int'l Workshop on Data Managemetn on New Hardware (DaMoN 2005); Jun. 12, 2005, Baltimore MD. 6 pages.*

Aryashev, et al., "Parallel FPGA Processor Card for Distributed Information Processing", retrieved on Mar. 7, 2007, at <<http://www.niisi.ru/old/pap_for.htm>>, pp. 1-11.

"Fpga-Press-3x: Data/ Image compression Pci -Board", available at least as early as Mar. 6, 2007, at <<www.gemac-chemnitz.de/all_pdf_files/fpga-board-flyer.pdf>>, pp. 1-2.

Lemolne, et al., "Run Time Reconfiguration of FPGA for Scanning Genomic DataBases", retrieved on Mar. 7, 2007, <<doi.eeecomputersociety.org/10.1109/FPGA.1995.477414>>, IEEE, 1995, pp. 1-2 .

Littlefield, "Board vendor FPGA toolkits make or break your project", available at least as early as Mar. 6, 2007, at <<www.cwcembedded.com/documents/contentdocuments/Article-MES-August-2006.pdf>>, Military Embedded Systems, 2006, pp. 1-4.

Burges, et al, "Learning to Rank with Nonsmooth Cost Functions", retrieved at <<http://research.microsoft.com/~cburges/papers/lambdarank.pdf>>, 2006, Microsoft, pp. 1-8.

Farber, et al, "Parallel Neural Network Training on Multi-Spert", retrieved at <<http://ieeexplore.ieee.org/iel4/5245/14210/00651531.pdf?tp=&arnumber=14210&arnumber=651531>>, IEEE, 1997, pp. 659-666.

Huang, et al, "Improving the Back Propagation Learning Speed with Adaptive Neuro-Fuzzy Technique", retrieved at <<http://ieeexplore.ieee.org/iel4/5797/15470/00714328.pdf?tp=&isnumber=714328>>, IEEE, 1993, pp. 2887-2900.

Joachims, "Optimizing Search Engines Using Clickthrough Data," retreived at http://www.cs.cornell.edu/People/tj/publications/joachims_02c.pdf, SIGKDD 02, Edmonton, Alberta, Canada, 2002, 10 pgs.

Li, et al, "Learning to Rank Using Classification and Gradient Boosting", retrieved at <<http://research.microsoft.com/~cburges/papers/BoostTreeRank.pdf>>, Microsoft, 2007, pp. 1-10.

Melnik et al, "Concave Learners for Rankboost," retreived at <<http://jmlr.csail.mit.edu/papers/volume8/melnik07a/melnik07a.pdf>>, Journal of Machine Learning Research, Apr. 25, 2007, pp. 791-812.

Raykar, et al, "A Fast Algorithm for Learning a Ranking Function from Large Scale Data Sets", retrieved at <<http://www.umiacs.umd.edu/users/vikas/publications/raykar_PAMI_2007.pdf>>, IEEE, Aug. 22, 2007, pp. 0-29.

Torresen, et al, "A Review of Parallel Implementations of Backpropagation Neural Networks", retrieved at <<http://ifi.uio.no/~jimtoer/chp2.ps>>, Chapter 2 in the book N. Sundararajan and P. Saratchandran (editors): Parallel Architectures for Artificial Neural Networks, IEEE CS Press, 1998, pp. 41-118.

Usunier et al, "Boosting Weak Ranking Functions to Enhance Passage Retrieval for Question Answering," retrieved at <<http://eprints.pascal-network.org/archive/00000428/02/BosWRF2EPR_IR4QA04.pdf.pdf>>, SIGIR 2004, Jul. 25-29, 2004, Sheffield, England, 6 pgs.

Xu et al, "FGPA-based Accelerator Design for RankBoost in Web Search Engines," retrieved at <<http://www.doc.ic.ac.uk/~wl/teachlocal/cuscomp/papers/fpt07nx.pdf>>, IEEE, 2007, 8 pgs.

Agarwal et al., "Proceesing of the NIPS 2005 Workshop on Learning to Rank", NIPS, Dec. 9, 2005, Whistler BC, Canada, 44 pages including pp#1-pp#40.

Akesson et al., "Augmented Virtuality: A Method to Automatically Augment Virtual Worlds with Video Images", Abstract, Preface and Table of Contents for Master Thesis at Swedish Institute of Computer Science, Nov. 1997, full text found at http://www.sics.se/~kalle/projects/Master_Thesis/Index.html., 5 pgs.

Billinghurst et al., "Collaborative Mixed Reality", In Proceedings of the 1st Intl Symposium on Mixed Reality (ISMR 99), Japan, Mar. 1999, 16 pgs.

Cloutier et al, "VIP: An FPGA-Based Processor for Image Processing and Neural Networks", Proceedings of MicroNeuro' 96, IEEE, 1996, pp#330-pp#336.

Fischer, et al., "Stylized Augmented Reality for Improved Immersion". <<http://www.gris.uni-tuebingen.de/people/staff/ bartz/Publications/paper/vr2005.pdf>> Last accessed on Aug. 17, 2007.

Julier, et al., "Information Filtering for Mobile Augmented Reality". Jul. 2, 2002. <<http://www.ait.nrl.navy.mil/3dvmel/papers/j_IEEECGA02.pdf>>.

McElligott et al., "ForSe FIElds—Force Sensors for Interactive Environments", Lecture Notes in Computer Science, UbiComp 2002: Ubiquitous Computing, 4th Intl Conf, Sweden Sep. 2002, vol. 2498, 8 pgs.

Muir, "Virtual Reality vs Composite Reality" Blog, retrieved on Jun. 6, 2007, at http://citrite.org/blogs/jeffreymuir/2007/02/22/virtual-reality-vs-composite-reality/, Feb 22, 2007, 3 pages.

Non-Final Office Action for U.S. Appl. 12/238,238. mailed on Aug. 16, 2011, Vincent, David Robert, "Field-Programmable Gate Array Based Accelerator System" 14 pages.

Non-Final Office Action for U.S. Appl. No. 12/238,012, mailed on Aug. 30, 2011, Ning-Yi Xu, "Automated Feature Selection Based on Rankboost for Ranking", 17 pages.

Piekarski et al., "ARQuake: The Outdoor Augmented Reality Gaming System", Communications of the ACM, vol. 45, No. 1, Jan. 2002, pp. 36-38.

Rose et al., "Annotating Real-World Objects Using Augmented Reality", Computer Graphics: Developments in Virtual Environments (Proc. CG Intl 95 Conf), Jun. 1995, 21 pgs.

Sestito, et al., "Intelligent Filtering for Augmented Reality". <<www.siaa.asn.,au/get/2395365383.pdf>> Last accessed on Aug. 17, 2007.

Simsarian et al., "Windows on the World: An Example of Augmented Virtuality", retrieved on Jun. 6, 2007 and found at http://www.sics.se/~kalle/published/wow.pdf, 7 pages.

Teitel, "The Eyephone: A Head-Mounted Stereo Display", Abstract, Proceedings of SPIE, Sep. 1990, Stereoscopic Displays and Applications, vol. 1256, 2 pgs.

Wikipedia, "Augmented Virtuality", retrieved on Jun. 6, 2007, at http://en.wikipedia.org/wiki/Augmented_virtuality, 1 pg.

Wikipedia, "EyeToy", retrieved on Jun. 6, 2007, found at http://en.wikipedia.org/wiki/EyeToy, 5 pages.

Yang et al., "Implementation of an RBF Neural Network on Embedded Systems: Real-Time Face Tracking and Identity Verification", IEEE Transactions on Neural Networks, vol. 14, No. 5, Sep. 2003, pp#1162-pp#1175.

Yue et al., "On Using Simultaneous Perturbation Stochastic Approximation of IR Measures, and the Empirical Optimality of LambdaRank", NIPS Machine Learning for Web Search Workshop, 2007, pp#1-pp#8.

* cited by examiner

| | | | | | | | | | | | | | | |
|---|---|---|---|---|---|---|---|---|---|---|---|---|---|---|
| PE0 | F(0,0) | F(8,0) | F(16,0) | ... | F(120,0) | F(0,1) | F(8,1) | F(16,1) | ... | F(120,1) | ... | F(0,N-1) | F(8,N-1) | F(16,N-1) | ... | F(120,N-1) |
| PE1 | F(1,0) | F(9,0) | F(17,0) | ... | F(121,0) | F(1,1) | F(9,1) | F(17,1) | ... | F(121,1) | ... | F(1,N-1) | F(9,N-1) | F(17,N-1) | ... | F(121,N-1) |
| PE2~6 | ... | ... | ... | ... | ... | ... | ... | ... | ... | ... | ... | ... | ... | ... | ... | ... |
| PE7 | F(7,0) | F(15,0) | F(23,0) | ... | F(127,0) | F(7,1) | F(15,1) | F(23,1) | ... | F(127,1) | ... | F(7,N-1) | F(15,N-1) | F(23,N-1) | ... | F(127,N-1) |

FIELD-PROGRAMMABLE GATE ARRAY BASED ACCELERATOR SYSTEM

BACKGROUND

Web search based ad services and search engines have become important tools for providing information to users. One factor in attracting users and advertisers is providing relevant information and ads for a given search query. Search relevance may be determined by a ranking function that ranks resultant documents according to their similarities to the input query.

Information retrieval (IR) researchers have studied search relevance for various search engines and tools. Representative methods include Boolean, vector space, probabilistic, and language models. Earlier search engines and tools were mainly based on such IR algorithms. These search engines and tools incorporate in varying degrees the concept of the ranking function. Many factors may affect the ranking function for search relevance. These factors may include page content, title, anchor, URL, spam, and page freshness. It is extremely difficult to manually tune ranking function parameters to accommodate these factors for large-scale data sets, such as those that are common in many applications including World Wide Web ("Web") applications and speech and image processing. For these large data sets, machine based learning algorithms have been applied to learn complex ranking functions from large-scale data sets.

Early algorithms for ranking function learning include Polynomial-based regression, Genetic Programming, RankSVM and classification-based SVM. However, these algorithms were only evaluated on a small-scale dataset due to the high computational cost. In fact, these traditional machine-learning algorithms operate slowly when searching large-scale data sets. Users often wait many hours, days, or even weeks to get results from these data sets. This slow computation time may be due, in part, to a typical personal computer (PC) being unable to exploit full parallelism in machine-learning algorithms efficiently.

Instruction level parallelism techniques somewhat improve the processing time. More particularly, distributed implementations with process level parallelism are faster than many of the PC central processing units (CPUs), which execute instructions in sequential manner. However, distributed implementations occupy many machines. Additionally, for some algorithms, distributed computing yields poor speed improvement per processor added due to communication cost. A Graphics Processing Unit (GPU)-based accelerator could only accelerate a limited spectrum of machine learning algorithms due to its special hardware structure optimized for graphics applications. Thus, memory access bandwidth, communication cost, flexibility and granularity of parallelism remain bottlenecks for these solutions.

SUMMARY

An accelerator system and method is provided that, according to one exemplary implementation, utilizes FPGA technology to achieve better parallelism and flexibility. The FPGA-based accelerator uses a PCI controller to communicate with a host CPU. A memory hierarchy composed of embedded Random Access Memory (RAM) in the FPGA, Static Random Access Memory (SRAM) and Synchronous Dynamic Random Access Memory (SDRAM), allows the FPGA assisted accelerator to take advantage of memory locality in algorithms.

According to another exemplary implementation, an FPGA-based accelerator system is combined with a relevance-ranking algorithm, such as the algorithm known as RankBoost, to increase the speed of a training process. Using an approximated RankBoost algorithm reduces the computation and storage scale from $O(N^2)$ to $O(N)$. This algorithm could be mapped to the accelerator system to increase the speed of the pure software implementation by approximately 170 times. Several techniques assist in achieving the acceleration rate. The algorithm and related data structures associated with the FPGA-based accelerator may be organized to enable streaming data access and, thus, increase the training speed. The data may be compressed to enable the system and method to be operable with larger data sets. At least a portion of the approximated RankBoost algorithm may be implemented as a single instruction multiple data streams (SIMD) architecture with multiple processing engines (PEs) in the FPGA. Thus, large data sets, such as a training set can be loaded on memories associated with an FPGA to increase the speed of the relevance ranking algorithm.

By virtue of this system, a user can train a ranking model with much less time and cost, so they can attempt different learning parameters of the algorithm in the same time, or carry out a study that depends on numerous ranking models.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 6 shows data sequences for the processing engine shown in FIG. 5.

DETAILED DESCRIPTION

Overview

An FPGA-based accelerator system for machine learning as described and claimed herein accelerates selected algorithms by providing better processing parallelism and memory access. The accelerator system may include an acceleration device, which may include a substrate, such as a Peripheral Component Interconnect (PCI) card, with a Field-Programmable Gate Array (FPGA) and memories acting as caches, e.g., SRAM, SDRAM, and so forth, connected to a computing device. One or more algorithms may be implemented on one or more of the FPGAs with direct parallel architecture and/or pipelined architecture to exploit both application parallelism and direct functional logic implementation. The PCI could also be replaced by other computer buses, including but not limited to PCI-X, PCI-Express, HyperTransport, Universal Serial Bus (USB) and Front-Side Bus (FSB).

A training data set or other data may be loaded onto one or more memories on the accelerator board, or onto embedded memories in the FPGA, to increase memory access bandwidth and data locality. The training data set may comprise information collected from Web searches to assess relevancy, and other characteristics. The system may include or be associated with one or more PCs or other computing devices, each computing device having one or more accelerator cards.

Exemplary System

Accelerator System Architecture

Figure 1:
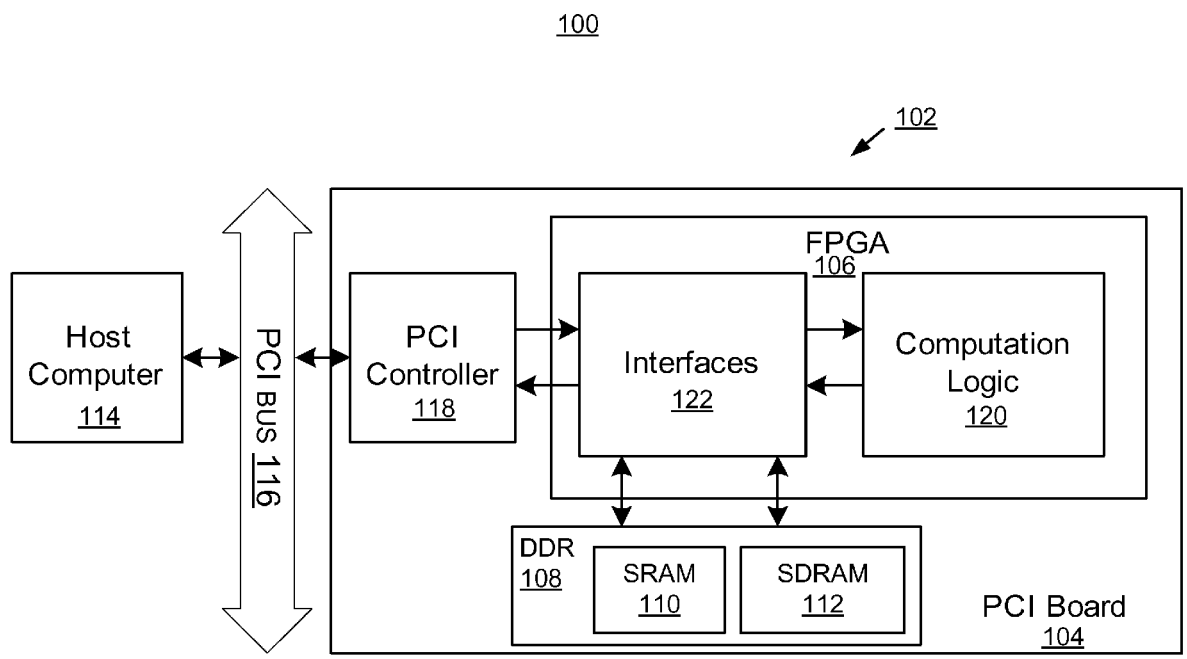
FIG. 1 shows an exemplary architecture of an FPGA based accelerator system for machine learning.

An exemplary system for use as an accelerator is shown in FIG. 1. The accelerator system 100 may include an acceleration device 102 comprising a Peripheral Component Interface (PCI) board 104 with a Field-Programmable Gate Array (FPGA) 106 and Double Data Rate (DDR) memory 108, e.g., SRAM 110, SDRAM 112, and so forth, connected to a computing device such as a host computer 114. The PCI board 104 may interface with a PCI bus 116 on or associated with the host computing device 114. The PCI board 104, and/or devices thereon, may communicate with the bus 116 thorough a PCI controller 118. The FPGA 106 may comprise computation logic 120 that communicates to the DDR memory devices 108 and/or the PCI controller 118 through one or more interfaces 122.

Training data or other data being accessed by the FPGA 106 may be loaded to DDR memory 108, including SRAM 110 or SDRAM 112, on the PCI board 104, or to embedded memories in the FPGA 106, in order to increase memory access bandwidth and data locality. Software loaded on the computer 114 may be capable of programming or re-programming the FPGA 106 at any time during processing.

Figure 2:
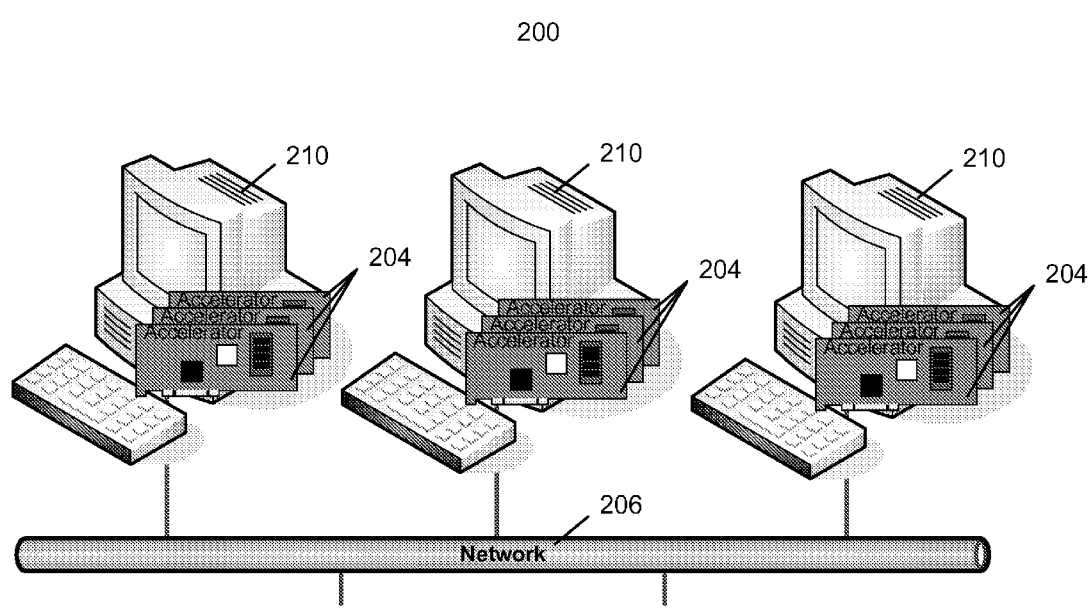
FIG. 2 shows an exemplary deployment of the accelerator.

As shown in FIG. 2, an acceleration system 200 may be composed of one or more computing devices 210, similar to computer 114, with each computing device 210 having one or more PCI cards 204, similar to PCI board 104. The computing devices 210 may be connected through a network 206. Thus, multiple cards 204 on multiple computing devices 210 may process data in parallel and thereby handle larger scale algorithms.

Figure 3:
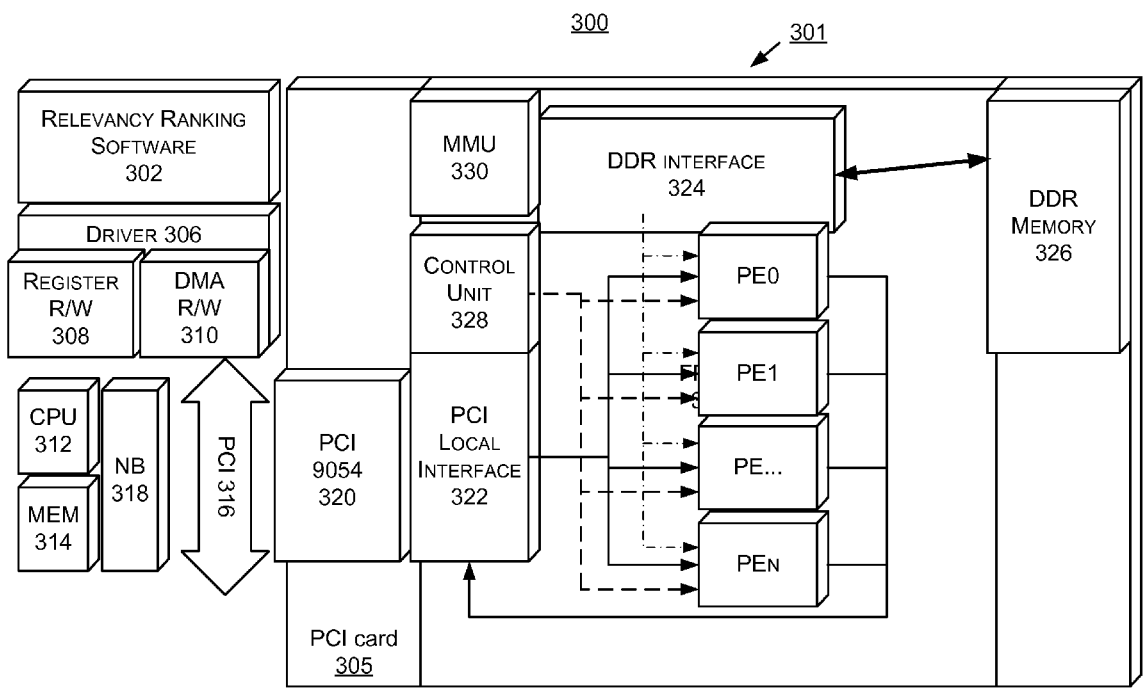
FIG. 3 shows an exemplary system architecture for an accelerator operable to perform relevance-ranking.

FIG. 3 shows a block diagram of a system 300 that is operable to implement relevance-ranking software 302 on an FPGA 304 residing on a substrate, such as a PCI card 305. The relevance ranking software 302 may have, or be associated with, a driver 306 having a register read/write (R/W) module 308 and/or a direct memory access read/write (DMA R/W) module 310 for operation of the software 302 with the CPU 312 and memory store 314 through a PCI 316 and/or Northbridge (NB) 318. The PCI card 305 may have a PCI 9054 Chip 320 or other 32-bit PCI bus mastering interface chip in order to facilitate communication between the FPGA 304 and the PCI 316.

The FPGA 304 may include a PCI local interface 322 for interfacing with the PCI 9054 chip 320. The PCI local interface 322 may also connect to the processing engine (PE) units, e.g., PE0, PE1, and PEn. The PE units implement the computation logic. The FPGA 304 may also have a DDR interface 324 for interfacing with DDR memory 326. The FPGA 304 may additionally have a control unit 328 for controlling the processing units PE0, PE1, PW, and PEn by sending a signal to the PE units. The FPGA 304 may also have a memory management unit (MMU) 330 for aligning or managing data for faster processing. The processing engines of the FPGA 304 may provide an output to the PCI local interface 320 for further implementation or use.

Figure 4:
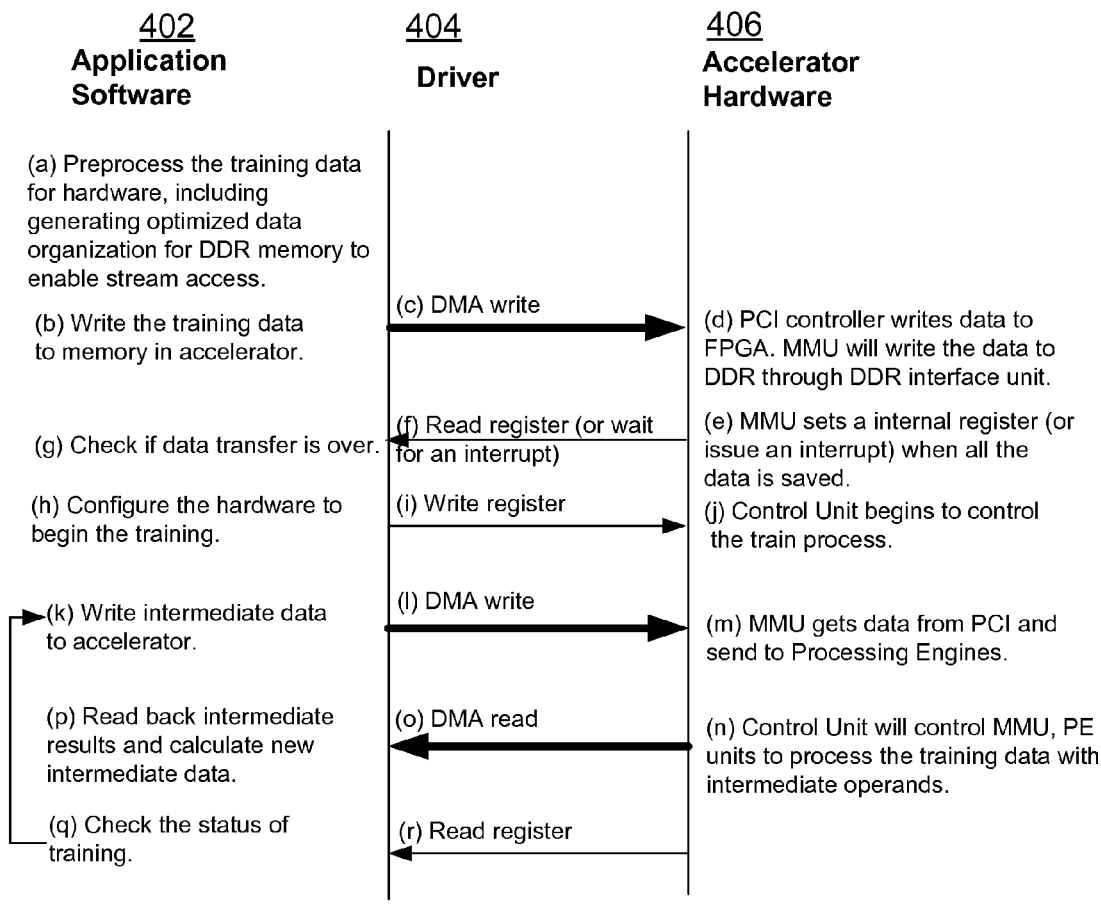
FIG. 4 shows an exemplary working flow of the accelerator system.

FIG. 4 illustrates an exemplary workflow 400 for processing and utilizing the training data in a system such as shown in FIG. 3. The first column 402 represents actions taken by the application software. The second column 404 represents driver-side activity. The third column 406 describes actions performed on, or by, hardware, such as accelerator device 301. In the following, steps (a)-(r) are steps for training. At (a), application software will process the training data for hardware. The possible processing may include organizing data in the sequence of how the FPGA logic will access and utilize it. At (b), application software will call the write routine in the driver (at (c)) to write the data to memories on the accelerator. The write routine may be implemented with a direct memory access (DMA) method to achieve high bandwidth access to the accelerator. At (d), upon receiving the training data, the PCI controller on the accelerator will write the data to the FPGA. Then the memory management unit (MMU) in the FPGA will write the data to DDR memory (or other cache memories). At (e), when all the data has been saved to the memory, the MMU may set a register, or issue an interrupt through PCI controller, indicating that the data transfer has been finished and the application software may proceed. At (g), the application software may check the status of the data transfer through register read routine in the driver (at (f)), or wait for the interrupt. At (h), application software configures the hardware to begin the training process by calling register write routine in the driver (at (i)). At (j), the control unit begins to control other hardware blocks to train using the training data. In the training process, at (k) application software may write (at (l)) some intermediate data to the accelerator hardware. At (m), the MMU in the accelerator sends this data to participate the training. At (p), this intermediate data may be generated from intermediate results of the training process (at (n)). At (q), the software may check the status of the training (at (r))) to determine if the training process needs to be continued for another round. The software continues to monitor the training process to decide when the training rounds should be stopped.

Data Organization

The accelerator system supports hierarchical memory organization and access methods using SDRAM, SRAM and RAM/registers within the FPGA.

According to one example, training data that will be iteratively used may be loaded onto SDRAM onboard an accelerator device, such as accelerator device 301. The training data loaded in the SDRAM may be organized according to its access order in logic associated with the FPGA by a software tool so that the FPGA can fetch data in a so-called, and well-known, "burst" mode, thus enabling high bandwidth access to the data set.

Randomly used large-scale data structures could be loaded to SRAM onboard the accelerator device, such as accelerator device 301, and associated with an FPGA, such as FPGA 304. According to this implementation, the SRAM may be used as a large low latency cache.

Temporary data structures, such as intermediate variables, parameters, and so forth, and results, e.g., the learned model, could be stored in distributed memory or registers inside the FPGA, which would act as high bandwidth, low latency cache. The data could be utilized without needing to access memory off of the FPGA, which would enhance the access speed of the cache.

Stream Data Processing Architecture

A streaming data access architecture and method may be incorporated with the accelerator system and/or the data organization structure, such as described above, to enable fast access to data in the host memory hierarchy and to decrease the amount of hardware/software communication for selected algorithms. Software, which may be provided by or on a host CPU, may configure a PCI bridge chip on the accelerator board to fetch data from a host memory hierarchy. The host memory hierarchy may provide a variety of memories including hard disks. The data will contain necessary information (generated and inserted by software), with which FPGA logic can perform computing functions over the data stream without interaction with software or drivers. Furthermore, the data will be organized in the sequence of how FPGA logic is accessing and utilizing it, such that input data is consumed at the time FPGA logic receives it. The FPGA may buffer the result for a delayed read from the software, which reduces the time and processing cost of hardware/software communication.

Data Compression/Decompression

A bit-map based data compression/decompression method for the architecture may be implemented to increase memory capacity and bandwidth available in the accelerator system. Training data may be compressed by conventional compression software and stored in the memories associated with the acceleration device. The FPGA may then read and decompress the data before performing computations. Implementing compression and decompression techniques with the FPGA may increase the virtual bandwidth from a DDR to a PE by 2-4 times the virtual bandwidth for uncompressed data.

Relevance-Ranking Algorithm

A machine learning, relevance ranking, algorithm may be implemented using the accelerator system. Generally, when ranking objects, the goal is to find a ranking function to order the given set of objects. Such an object is denoted as an instance x in a domain (or instance space) X. As a form of feedback, information about which instance should be ranked above (or below) one another is provided for every pair of instances. This feedback is denoted as function $\Phi: X \times X \rightarrow R$, where $\Phi(x_0, x_1) > 0$ means $x_1$ should be ranked above $x_0$, and $\Phi(x_0, x_1) < 0$ means $x_0$ should be ranked above $x_1$. A learner then attempts to find a ranking function $H: X \rightarrow R$, which is as consistent as possible to the given $\Phi$, by asserting $x_1$ is preferred over $x_0$ if $H(x_1) > H(x_0)$.

A relevance-ranking algorithm may be used to learn the ranking function H by combining a given collection of ranking functions. The relevance-ranking algorithm may be pair-based or document-based. The psuedocode for one such relevance ranking algorithm, is shown below:

Initialize: Distribution D over X×X
Do for t=1, . . . , T:
(1) Train WeakLearn using distribution $D_t$.
(2) WeakLearn returns a weak hypothesis $h_t$.
(3) Choose $\alpha_t \in R$
(4) Update weights: for each pair $(d_0, d_1)$:

$$D_{t+1}(d_0, d_1) = \frac{D_t(d_0, d_1)\exp(-\alpha_t(h_t(d_0) - h_t(d_1)))}{Z_t}$$

where $Z_t$ is the normalization factor:

$$Z_t = \sum_{x_0, x_1} D_t(d_0, d_1)\exp(-\alpha_t(h_t(d_0) - h_t(d_1))).$$

Output: the final hypothesis:

$$H(x) = \sum_{t=1}^{T} \alpha_t h_t$$

The relevance-ranking algorithm is utilized in an iterative manner. In each round, a procedure named "WeakLearn" is called to select the best "weak ranker" from a large set of candidate weak rankers. The weak ranker has the form $h_t$: $X \rightarrow R$ and $h_t(x_1) > h_t(x_0)$ means that instance $x_1$ is ranked higher than $x_0$ in round t. A distribution $D_t$ over X×X is maintained in the training process. Weight $D_t(x_0, x_1)$ will be decreased if $h_t$ ranks $x_0$ and $x_1$ correctly ($h_t(x_1) > h_t(x_0)$), and increased otherwise. Thus, $D_t$ will tend to concentrate on the pairs that are hard to rank. The final strong ranker H is a weighted sum of the selected weak rankers in each round.

The WeakLearn algorithm may be implemented to find the weak ranker with a maximum $r(f, \theta)$, by generating a temporary variable $\pi(d)$ for each document. The WeakLearn algorithm may be defined as follows:

Given: Distribution $D(d_0, d_1)$ over all pairs
Initialize: (1) For each document d(q):

$$\text{Compute } \pi(d(q)) = \sum_{d'(q)} (D(d'(q), d(q)) - D(d(q), d'(q)))$$

(2) For every feature $f_k$ and every threshold $\theta_s^k$:

$$\text{Compute } r(f_k, \theta_s^k) = \sum_{d(q): f_k(d(q)) > \theta_s^k} \pi(d(q))$$

(3) Find the maximum $|r^*(f_{k^*}, \theta_{s^*}^{k^*})|$
(4) Compute:

$$\alpha = \frac{1}{2}\ln\left(\frac{1+r^*}{1-r^*}\right)$$

Output: weak ranking $(f_{k^*}, \theta_{s^*}^{k^*})$ and $\alpha$.

To extend the relevance-ranking algorithm to Web relevance ranking, training pairs may be generated and weak rankers may be defined. To generate the training pairs, the instance space for a search engine may be partitioned according to queries issued by users. For each query q, the returned documents may be rated a relevance score, from 1 (means 'poor match') to 5 (means 'excellent match') using a manual or automated process. Unlabeled documents may be given a relevance score of 0. Based on the rating scores (ground truth), the training pairs for the relevance-ranking algorithm may be generated from the returned documents for each query.

So-called "weak rankers" may be defined as a transformation of a document feature, which is a one-dimensional real value number. Document features can be classified into query dependent features, such as query term frequencies in a document and term proximity, and query independent features, such as PageRank, and so forth. Thus, the same document may be represented by different feature vectors for different queries based upon its query-dependent features.

In keeping with the previous algorithm example, a document may be designated as d(q), a pair as $\{d_1(q), d_2(q)\}$, and $d^i_j$ means a document for query $q_i$. The $k_{th}$ feature for document is denoted as $f_k(d^i_j)$. With these notations, an alternative relevance-ranking algorithm may be implemented as follows.

Initialize: initial distribution D over X×X
Given: $N_q$ queries $\{q_i|i=1\ldots, N_q\}$.
$N_i$ documents $\{d^i_j|j=1, \ldots, N_i\}$ for each query $q_i$, where $$\sum_{i=1}^{N_q} N_i = N_{doc}.$$

$N_f$ features $\{f_k(d^i_j)|j=1, \ldots, N_f\}$ for each document $d^i_j$
$N^k_\theta$ candidate thresholds $\{\theta^k_s|s=1, \ldots, N^k_\theta\}$ for each $f_k$.
$N_{pair}$ pairs $(d^i_{j1}, d^i_{j2})$ generated by ground truth rating $\{R(q_i,d^i_j)\}$ or $\{R^i_j\}$.
Initialize: initial distribution $D(d^i_{j1}, d^i_{j2})$ over X×X
Do for t=1, ..., T:
(1) Train WeakLearn using distribution $D_t$.
(2) WeakLearn returns a weak hypothesis $h_t$, weight $\alpha_t$
(3) Update weights: for each pair $(d_0, d_1)$:

$$D_{t+1}(d_0, d_1) = \frac{D_t(d_0, d_1)\exp(-\alpha_t(h_t(d_0) - h_t(d_1)))}{Z_t}$$

where $Z_t$ is the normalization factor:

$$Z_t = \sum_{x_0, x_1} D_t(d_0, d_1)\exp(-\alpha_t(h_t(d_0) - h_t(d_1))).$$

Output: the final hypothesis:

$$H(x) = \sum_{t=1}^{T} \alpha_t h_t$$

For the relevance-ranking algorithms described by example above, WeakLearn may be defined as a routine that uses the $N_f$ document features to form its weak rankers, attempting to find the one with the smallest pair-wise disagreement relative to distribution D over $N_{pair}$ document pairs. The weak ranker may be defined by the following relationship:

$$h(d) = \begin{cases} 1 & \text{if } f_i(d) > \theta \\ 0 & \text{if } f_i(d) \leq \theta \text{ or } f_i(d) \text{ is undefined} \end{cases}$$

To find the best h(d), the weak learner checks all of the possible combinations of feature $f_i$ and threshold $\theta$. The WeakLearn algorithm may be implemented to ascertain a maximum $r(f, \theta)$ by generating a temporary variable $\pi(d)$ for each document. Intuitively, $\pi$ contains information regarding labels and pair weights, and the weak ranker only needs to access $\pi$ in a document-wise manner for each feature and each threshold, that is $O(N_{doc}N_fN_\theta)$, in a straightforward implementation. Based on this, an alternative weak learner may be utilized using an integral histogram to further reduce the computational complexity to $O(N_{doc}N_f)$. Because of this relatively low computational complexity, the algorithm may be implemented in both software and hardware, e.g., an accelerator system utilizing an FPGA, as described above.

According to the implementation, r may be calculated in $O(N_{doc}N_f)$ time in each round using an integral histogram in $O(N_{doc}N_f)$ time. First, feature values $\{f_k(d)\}$ in a dimension of the whole feature vector $(f_1, \ldots, f_{N_f})$ may be classified into $N_{bin}$ bins. The boundaries of these bins are:

$$\theta^k_s = \frac{f^k_{max} - f^k_{min}}{N_{bin}} \cdot s + f^k_{min}, s = 0, 1, \ldots, N_{bin},$$

where $f_{max}^k$ and $f_{min}^k$ are maximum and minimum values of all $f_k$ in the training data set. Then each document d can be mapped to one of the bins according to the value of $f_k(d)$:

$$Bin_k(d) = \text{floor}\left(\frac{f_k(d) - f^k_{min}}{f^k_{max} - f^k_{min}} \cdot N_{bin} - 1\right)$$

The histogram of $\pi(d)$ over featured $f_k$ is then built using:

$$Hist_k(i) = \sum_{d:Bin_k(d)=i} \pi(d), i = 0, \ldots, (N_{bin} - 1)$$

Then, an integral histogram can be determined by adding elements in the histogram from the right ($i=N_{bin}-1$) to the left (i=0). That is, $$Integral_k(i) = \sum_{a>i} Hist_k(a), i = 0, \ldots, (N_{bin} - 1)$$

Exemplary Implementation of Relevance-Ranking Algorithm

A relevance-ranking algorithm, such as described above, may be implemented using an FPGA based accelerator system, also described above. The main computing data structure is a histogram, mapped to the architecture of single instruction multiple data streams (SIMD) with distributed memories. The SIMD architecture is capable of separately building several integral histograms with multiple PE units at the same time, as described above.

Software provided on or to the host computer will send the quantized feature values to a DDR memory through the PCI bus, PCI controller and FPGA. As described above, the data may be organized to enable streaming memory access, which can make full use of DDR memory bandwidth. In each training round, the software will call WeakLearn to compute $\pi(d)$ for every document, and send $\pi(d)$ to a First In First Out (FIFO) queue in the FPGA. The control unit (CU) in the FPGA will direct the PE arrays to build histograms and integral histograms, and will then send the results $r(f, \theta)$ as output to the FIFO queue. The CU is implemented as a finite state machine (FSM), which halts or resumes the pipeline in PE units according to the status of each FIFO. When the CU indicates that the calculation of r is finished, the software will read back these r values and select the maximum value. Then the software will update the distribution $D(d_0, d_1)$ over all pairs and begin the next round.

Figure 5:
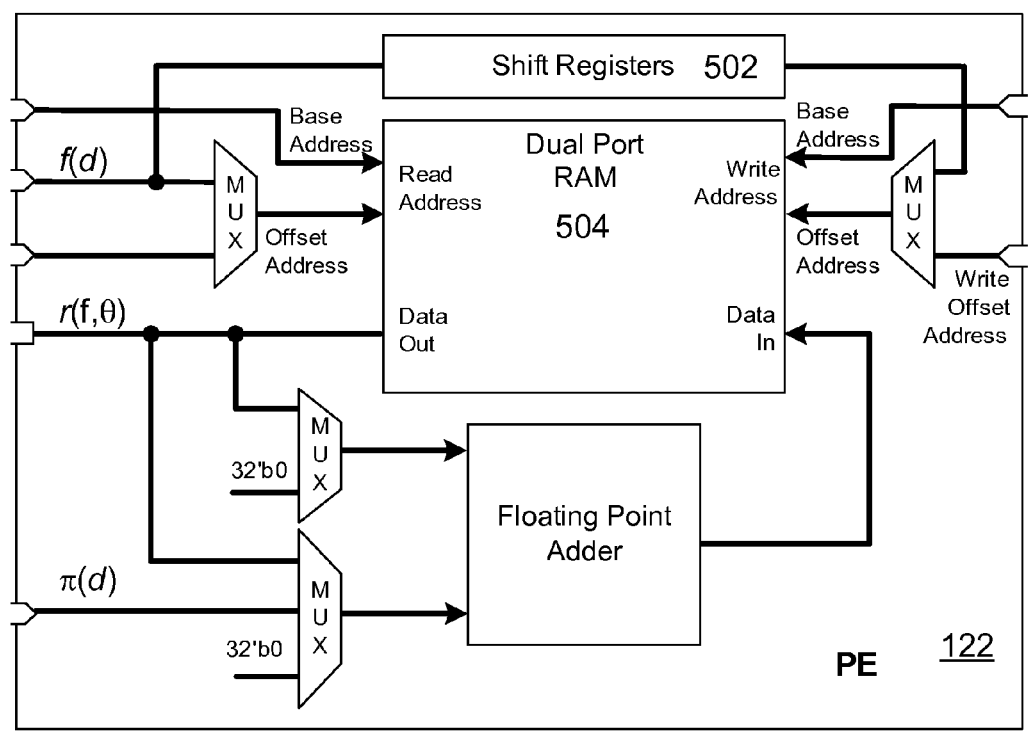
FIG. 5 shows an exemplary architecture of a processing engine (PE) for an accelerator operable to perform relevance-ranking.

It is noted that the micro-architecture of the PE supports fully-pipelined operation, which enhances the performance of hardware, particularly with regard to machine learning algorithms, such as a relevance-ranking algorithm. FIG. 5 illustrates an exemplary micro-architecture of a processing engine 500, such as PE0, PE1, or PEn, previously described. This micro-architecture may be used in building the integral histogram for a relevance ranking algorithm, such as RankBoost. The dual port RAM 502 is used to store the histograms and integral histograms in the building process. The base address of the RAM indexes the feature and the offset address indexes the bin of histogram or integral histogram as defined in the $\text{Hist}_k(i)$ and $\text{Integral}_k(i)$ equations described above. The shift registers 504 are used to delay the input feature $j(d)$. First, the histogram is built. Feature values $f_k(d)$ are input as the offset address to read out the corresponding intermediate values $\text{Hist}_k(i)$ of the bin i. Then the other input $\pi(d)$ will be added to $\text{Hist}_k(i)$, and the result will be saved to the same bin where $\text{Hist}_k(i)$ is read out.

An example data input 600 into 8 PE arrays with 16 features per PE is illustrated in FIG. 6. First, software aligns a given amount data in its original format. A software tool may be used to rearrange this data in the memory to generate binary data for storage in a memory block. The data is ordered according to the order that the FPGA will access the data. Moreover the input data may be organized to be aligned with the PE, as shown in FIG. 6, thereby mapping the data structure to the memories. This data organization enables a streaming memory access. The integral histogram can be implemented with this data structure based on the histogram stored in the dual port RAM. The values are read out, added and then stored back to the memory according to the $\text{Integral}_k(i)$ equation described above. At last the final result $r(f, \theta)$ will be read out.

Figure 7:
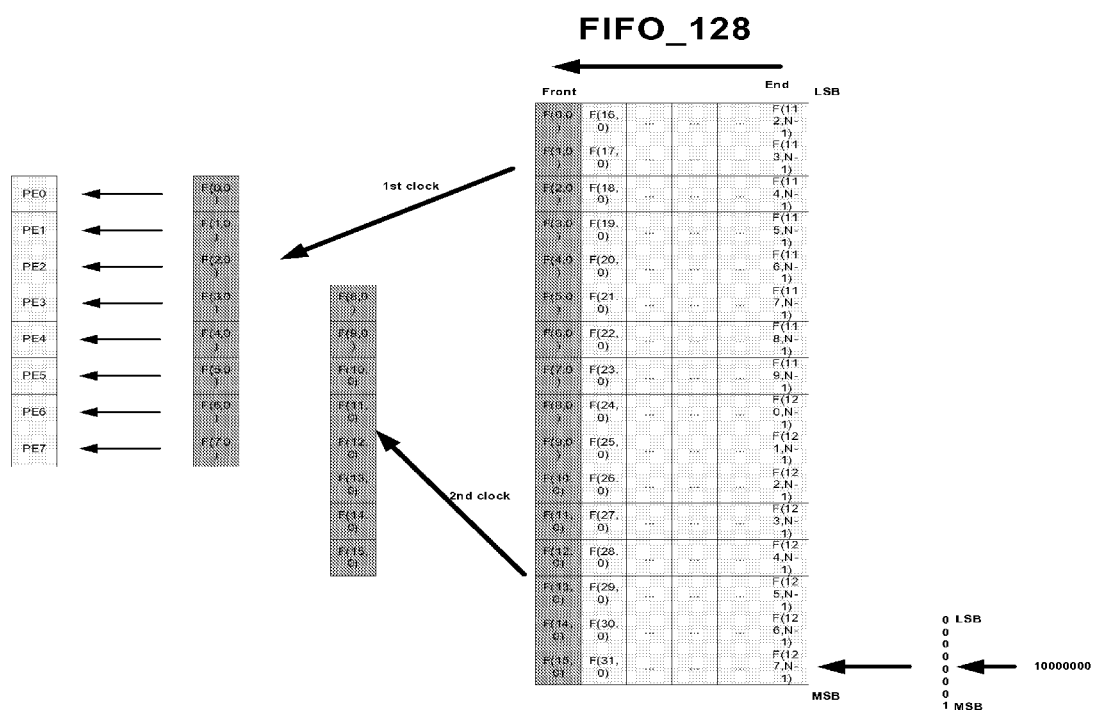
FIG. 7 shows an exemplary data format and processing sequence for a First In First Out (FIFO) buffer.

A streaming memory access organization can also be used for the FIFO buffer that will provide data from the DDR memory to the group of PE units. The width of the FIFO associated with the PE array may be, for example, 128 bits, which is equivalent to 16 bytes. The data in the FIFO can be arranged as shown in FIG. 7 to map the data to the PE units and further enable streaming memory access to data transferred from the DDR to the FPGA. Thus, running the relevance-ranking algorithm utilizing an FPGA and incorporating streaming memory access provides fast processing of large data sets.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A system comprising:
a Field Programmable Gate Array (FPGA) to perform a machine learning algorithm using training data;
a Peripheral Component Interface (PCI) controller to communicate with a Central Processing Unit (CPU) of a host computing device, and
a memory hierarchy composed of Static Random Access Memory (SRAM) and Synchronous Dynamic Random Access Memory (SDRAM) associated with the FPGA and embedded Random Access Memory (RAM) within the FPGA, the training data being loaded onto at least a portion of the memory hierarchy and organized according to a streaming memory access order for streaming memory access by logic associated with the FPGA; and
a control unit within the FPGA to direct the FPGA to:
build a histogram based in part on at least a subset of the training data;
build an integral histogram based in part on the histogram; and
send a result of the machine learning algorithm to a First In First Out (FIFO) queue for presentation to the host computing device, the result being based at least in part on the integral histogram.

2. A system according to claim 1, wherein the machine learning algorithm comprises a document-based relevance-ranking algorithm implemented at least in part as a single instruction multiple data stream (SIMD) architecture with multiple processing engines (PEs) in the FPGA.

3. A system according to claim 1, wherein:
randomly used large-scale data structures are loaded onto the SRAM to be used as a large low latency cache; and
temporary data structures are stored in the embedded RAM to act as high bandwidth, low latency cache.

4. A system according to claim 1, wherein multiple FPGAs are provided for connection to a computer.

5. A system according to claim 4, wherein multiple computers are connected together through a network.

6. A system according to claim 1, the training data being stored in the memory hierarchy in a compressed format, the FPGA configured to decompress the training data prior to the using the training data.

7. A system according to claim 1, the streaming memory access order enabling the streaming memory access by the logic without interaction with software or drivers.

8. A system as recited in claim 1, wherein the FPGA has at least one processing engine, and the at least one processing engine is controlled by a control unit.

9. A system as recited in claim 1, wherein the machine learning algorithm comprises a relevance ranking algorithm.

10. A system as recited in claim 9, wherein the relevance ranking algorithm incorporates a RankBoost algorithm.

11. A system as recited in claim 9, wherein the relevance ranking algorithm is document based.

12. A system as recited in claim 1, wherein the FPGA is a first FPGA associated with a first computing device, the system further comprising a network connecting the first FPGA associated with the first computing device to a second FPGA associated with a second computing device.

13. A system as recited in claim 12, wherein the first and second computing devices are each associated with multiple FPGA devices.

14. A system as recited in claim 1, the training data comprises feature values of documents classified into bins defining the streaming memory access order.

15. A system as recited in claim 14, the FPGA builds the histogram based in part on feature values of at least one of the documents classified into the bins associated with the subset of the training data.

16. A system as recited in claim 1, wherein the FPGA comprises multiple processing engines (PEs), and the training data is arranged in a First In First Out (FIFO) buffer to map the training data onto each of the multiple PEs using the streaming memory access order, the streaming memory access order enabling the streaming memory access by each of the PEs without interaction with software or drivers.

17. A system comprising:
a Field Programmable Gate Array (FPGA) to perform a machine learning algorithm using training data, the FPGA comprising multiple processing engines (PEs);
a Peripheral Component Interface (PCI) controller to communicate with a Central Processing Unit (CPU) of a host computing device; and a memory hierarchy composed of Static Random Access Memory (SRAM) and Synchronous Dynamic Random Access Memory (SDRAM) associated with the FPGA and embedded Random Access Memory (RAM) within the FPGA, the training data being loaded onto the memory hierarchy and organized according to a streaming memory access order for streaming memory access by each of the PEs, the streaming memory access order enabling the streaming memory access by each of the PEs without interaction with software or drivers, the training data being stored in the memory hierarchy in a compressed format, the FPGA being configured to decompress the training data prior to the using the training data; and a control unit within the FPGA to direct one or more components of the FPGA to:
   build a histogram based in part on at least a subset of the training data;
   build an integral histogram based in part on the histogram; and
   provide a result of the machine learning algorithm for presentation to the host computing device, the result being based at least in part on the integral histogram.

18. A system according to claim 17, wherein multiple FPGAs are provided for connection to a computer.

19. A system as recited in claim 17, wherein the machine learning algorithm comprises a relevance ranking algorithm that incorporates a RankBoost algorithm that is document based.

20. A system as recited in claim 17, the training data comprises feature values of documents classified into bins defining the streaming memory access order.

21. A system as recited in claim 20, the FPGA builds the histogram based in part on the feature values of at least one of the documents classified into the bins associated with the subset of the training data.

22. A system comprising:
   a Field Programmable Gate Array (FPGA) to perform a machine learning algorithm using training data, the machine learning algorithm comprising a document-based relevance-ranking algorithm implemented at least in part as a single instruction multiple data streams (SIMD) architecture using processing engines (PEs) in the FPGA;
   a memory hierarchy composed of Double Data Rate (DDR) memory associated with the FPGA and embedded Random Access Memory (RAM) within the FPGA, the training data being loaded onto the memory hierarchy and organized according to a streaming memory access order for streaming memory access by each of the PEs, the training data includes feature values of documents classified into bins that define at least in part the streaming memory access order; and
   a control unit within the FPGA to direct the PEs to:
      build histograms based in part on the feature values of the documents as classified into the bins; and
      build multiple integral histograms based in part on at least a subset of the histograms, the multiple integral histograms being built at the same time.

* * * * *